United States Patent [19]

Hefner, Jr. et al.

[11] Patent Number: 4,835,228

[45] Date of Patent: May 30, 1989

[54] RHEOLOGY LOW GLOSS, HIGH IMPACT STRENGTH POWDER COATING RESINS

[75] Inventors: Robert E. Hefner, Jr., Lake Jackson; Deborah I. Haynes, Freeport, both of Tex.

[73] Assignee: The Dow Chemical Company, Midland, Mich.

[21] Appl. No.: 126,397

[22] Filed: Nov. 30, 1987

Related U.S. Application Data

[63] Continuation-in-part of Ser. No. 849,616, Apr. 8, 1986, abandoned.

[51] Int. Cl.$^4$ .............................................. C08G 59/16
[52] U.S. Cl. .................................. 525/524; 525/529; 525/531; 525/934
[58] Field of Search ............... 525/109, 119, 524, 531

[56] References Cited

U.S. PATENT DOCUMENTS

| | | | |
|---|---|---|---|
| 4,285,847 | 8/1981 | Ting | 525/530 |
| 4,308,185 | 12/1981 | Evans et al. | 525/530 |
| 4,315,044 | 2/1982 | Elmore et al. | 523/403 |
| 4,399,242 | 8/1983 | Fowler et al. | 523/404 |
| 4,526,940 | 7/1985 | Seymour et al. | 525/526 |

FOREIGN PATENT DOCUMENTS

| | | | |
|---|---|---|---|
| WO/00610 | 2/1985 | PCT Int'l Appl. | 525/530 |
| 2046767A | 11/1980 | United Kingdom | 525/530 |

OTHER PUBLICATIONS

Detroit Society for Paint Technology, "Powder Coating:Why-When-How", *Journal of Paint Technology*, vol. 44, No. 565, 2/1972, pp. 30-37.

*Primary Examiner*—Lewis T. Jacobs
*Assistant Examiner*—Robert E. L. Sellers, II
*Attorney, Agent, or Firm*—James G. Carter

[57] ABSTRACT

Novel advanced epoxy resins are disclosed which are the product resulting from (I) polymerizing in the presence of a catalytic quantity of a suitable polymerization catalyst (A) the reaction product of (1) a mixture consisting of (a) a diglycidyl ether of a dihydric phenol or a diglycidyl ether of a dihydric cyclohexanol and (b) a diglycidyl ether of a mono-, di- or polyetherdiol with (2) a compound containing both a group reactive with an epoxide group and a polymerizable ethylenically unsaturated group; with (B) a monomer mixture containing (1) at least one vinyl aromatic monomer, (2) a compound containing both a group reactive with an epoxide group and a polymerizable ethylenically unsaturated group and optionally (3) a hydroxyalkyl acrylate or methacrylate or an alkyl acrylate or methacrylate; and (II) advancing in the presence of a catalytic quantity of a suitable advancement catalyst, the product from (I) with (C) a dihydric phenol.

24 Claims, No Drawings

RHEOLOGY LOW GLOSS, HIGH IMPACT STRENGTH POWDER COATING RESINS

CROSS REFERENCE TO RELATED APPLICATION

This application is a continuation-in-part of application Ser. No. 849,616 filed Apr. 8, 1986, now abandoned.

BACKGROUND OF THE INVENTION

Advanced epoxy resin compositions which have been modified by the in situ formation of the copolymerization product of a vinyl aromatic monomer and minor amounts of a compound containing a group reactive with an epoxide group and a polymerizable ethylenically unsaturated group are taught by Hefner, Jr., et al in copending application Ser. No. 790,991 filed Oct. 24, 1985. These resins are used to prepare thermosettable powder coatings which when cured (thermoset) provide low gloss, high impact strength coatings. Although excellent cured coatings are provided, the relatively high viscosity per unit epoxide equivalent weight of the modified advanced epoxy resins leads to difficult processability, reduced filler acceptability as well as marginal rheology on curing.

The present invention provides a specific process which results in low gloss, high impact strength epoxy resins with substantially reduced viscosity per unit epoxide equivalent weight and resultant improvements in processability, filler acceptability and rheology.

SUMMARY OF THE INVENTION

One aspect of the present invention pertains to advanced epoxy resin compositions which comprise the product resulting from
(I) polymerizing in the presence of a catalytic quantity of at least one suitable polymerization catalyst
  (A) the reaction product of
    (1) a mixture comprising
      (a) from about 80 to about 99, preferably from about 90 to about 95 percent by weight of at least one diglycidyl ether of a dihydric phenol or dihydric cyclohexanol having an epoxide equivalent weight of from about 111 to about 350 with the epoxide equivalent weight being calculated on the basis that there are no substituent groups attached to the aromatic ring(s) or cycloaliphatic ring(s) other than hydrogen and the ether oxygen atoms even though the aromatic ring(s) or cycloaliphatic ring(s) may in fact be substituted by groups other than hydrogen and the ether oxygen atoms;
      (b) from about 1 to about 20, preferably from about 5 to about 10, percent by weight of at least one diglycidyl ether of a mono-, di- or polyetherdiol; with
    (2) at least one compound containing both a group reactive with an epoxide group and a polymerizable ethylenically unsaturated group in an amount of from about 0.001 to about 0.05, preferably from about 0.005 to about 0.025, equivalent per epoxide equivalent contained in component (A-1); with
  (B) a monomer mixture comprising
    (1) at least one vinyl aromatic monomer in an amount of from about 31 to about 60, preferably from about 35 to about 45, percent by weight of the combined weight of components (A), (B) and (C);
    (2) at least one compound containing both a group reactive with an epoxide group and a polymerizable ethylenically unsaturated group in an amount of from about 0.001 to about 0.05, preferably from about 0.005 to about 0.025, equivalent per epoxide equivalent contained in component (A-1); and optionally
    (3) one or more hydroxyalkyl acrylate, hydroxyalkyl methacrylate, alkyl acrylate or alkyl methacrylate in an amount of from about zero to about 15, preferably from about zero to about 5, percent by weight of the combined weight of components (B-1) and (B-3); and
(II) advancing in the presence of a catalytic quantity of at least one suitable advancement catalyst, the product resulting from (I) with
  (C) at least one dihydric phenol in an amount of from about 0.125 to about 0.8, preferably from about 0.375 to about 0.5, hydroxyl equivalent per epoxide equivalent in component (A-1).

Another apsect of the present invention pertains to advanced epoxy resin compositions which comprise the product resulting from
(I) polymerizing in the presence of a catalytic quantity of at least one suitable polymerization catalyst
  (A) the reaction product of
    (1) at least one diglycidyl ether of a dihydric phenol or dihydric cyclohexanol having an epoxide equivalent weight of from about 111 to about 350 with the epoxide equivalent weight being calculated on the basis that there are no substituent groups attached to the aromatic ring(s) or cycloaliphatic ring(s) other than hydrogen and the ether oxygen atoms even though the aromatic ring(s) or cycloaliphatic ring(s) may in fact be substituted by groups other than hydrogen and the ether oxygen atoms;
    (2) at least one compound containing both a group reactive with an epoxide group and a polymerizable ethylenically unsaturated group in an amount of from about 0.001 to about 0.05, preferably from about 0.005 to about 0.025, equivalent per epoxide equivalent contained in component (A-1); with
  (B) a monomer mixture comprising
    (1) at least one vinyl aromatic monomer in an amount of from about 31 to about 60, preferably from about 35 to about 45, percent by weight of the combined weight of components (A), (B) and (C);
    (2) at least one compound containing both a group reactive with an epoxide group and a polymerizable ethylenically unsaturated group in an amount of from about 0.001 to about 0.05, preferably from about 0.005 to about 0.025, equivalent per epoxide equivalent contained in component (A-1); and optionally
    (3) one or more hydroxyalkyl acrylate, hydroxyalkyl methacrylate, alkyl acrylate or alkyl methacrylate in an amount of from about zero to about 15, preferably from about zero to about 5, percent by weight of the combined weight of components (B-1) and (B-3); and (II) advancing in the presence of a catalytic quantity of at least one suitable advancement catalyst, the product resulting from (I) with a mixture comprising
- (C) at least one dihydric phenol in an amount of from about 0.125 to about 0.8, preferably from about 0.375 to about 0.5, hydroxyl equivalent per epoxide equivalent in component (A-1) and
- (D) at least one diglycidyl ether of a mono-, di- or polyetherdiol or at least one phenolic capped adduct of a diglycidyl ether of a mono-, di- or polyetherdiol or combination thereof wherein the amount of the diglycidyl ether or the amount of the diglycidyl ether contained in the capped diglycidyl ether is from about 1 to about 20, preferably from about 5 to about 10, percent by weight of components (I-A-1) and (II-D).

A further aspect of the present invention concerns thermosettable (curable) compositions prepared by combining one or more of the advanced epoxy resin compositions with a curing quantity of at least one suitable curing agent for the aforementioned advanced epoxy resin compositions.

Still another aspect of the present invention pertains to the products and compositions resulting from curing the aforementioned thermosettable compositions.

DETAILED DESCRIPTION OF THE INVENTION

Suitable diglycidyl ethers of a dihydric phenol which can be employed herein include, for example, those represented by the following formulas I and II. Suitable diglycidyl ethers of a dihydric cyclohexanol include, for example, those represented by the following formulas III and IV.

wherein each A is independently a divalent hydrocarbon group having from one to about 10 carbon atoms, $-O-$, $-S-$, $-S-S-$, $-SO-$, $-SO_2-$, $-CO-$; each X is independently hydrogen, bromine, chlorine, or a hydrocarbyl or hydrocarbyloxy group having from 1 to about 10 carbon atoms; each R is independently hydrogen or a methyl group; m has a value from zero to about 5, preferably from about zero to about 3; and n has a value of zero or 1.

The term hydrocarbyl as employed herein means any aliphatic, cycloaliphatic, aromatic, aryl substituted aliphatic, or aliphatic substituted aromatic groups. Likewise, the term hydrocarbyloxy group means a hydrocarbyl group having an oxygen linkage between it and the object to which it is attached.

Suitable diglycidyl ethers of a dihydric phenol which can be employed herein include, for example, the diglycidyl ethers of resorcinol, hydroquinone, catechol, bisphenol A (4,4'-isopropylidenediphenol), bisphenol F (bis(4,4'-dihydroxyphenyl)methane), 2,2'-bis-(4-hydroxyphenyl)pentane, 3,3',5,5'-tetramethyl-4,4'-dihydroxydiphenyl, 4,4'-dihydroxydiphenyl sulfone, 4,4'-dihydroxybenzophenone, 3,3',5,5'-tetrabromo-4,4'-isopropylidenediphenol, 4,4'-bis(p-hydroxyphenyl)diphenyl ether, 4,4'-dihydroxydiphenyl sulfide, mixtures thereof and the like. Most preferred as the diglycidyl ether of a dihydric phenol are the diglycidyl ethers of bisphenol A.

Suitable diglycidyl ethers of a dihydric cyclohexanol which can be employed herein include, for example, the diglycidyl ethers of hydrogenated bisphenol A (4,4'-isopropylidenedicyclohexanol), hydrogenated bisphenol F (bis(4,4'-dihydroxycyclohexyl)methane), hydrogenated 4,4'-dihydroxybenzophenone, 2,2'-bis-(4-hydroxycyclohexyl)pentane, 3,3',5,5'-tetramethyl-4,4'-dihydroxydicyclohexyl, 4,4'-dihydroxydicyclohexyl sulfone, 3,3',5,5'-tetrabromo-4,4'-isopropylidenedicyclohexanol, 4,4'-bis(p-hydroxycyclohexyl)diphenyl ether, 4,4'-dihydroxydicyclohexyl sulfide, mixtures thereof and the like. Most preferred as the diglycidyl ether of a dihydric cyclohexanol are the diglycidyl ethers of hydrogenated bisphenol A.

Suitable diglycidyl ethers of a mono-, di- or polyetherdiol which can be employed herein include, for example, those represented by the following formula V

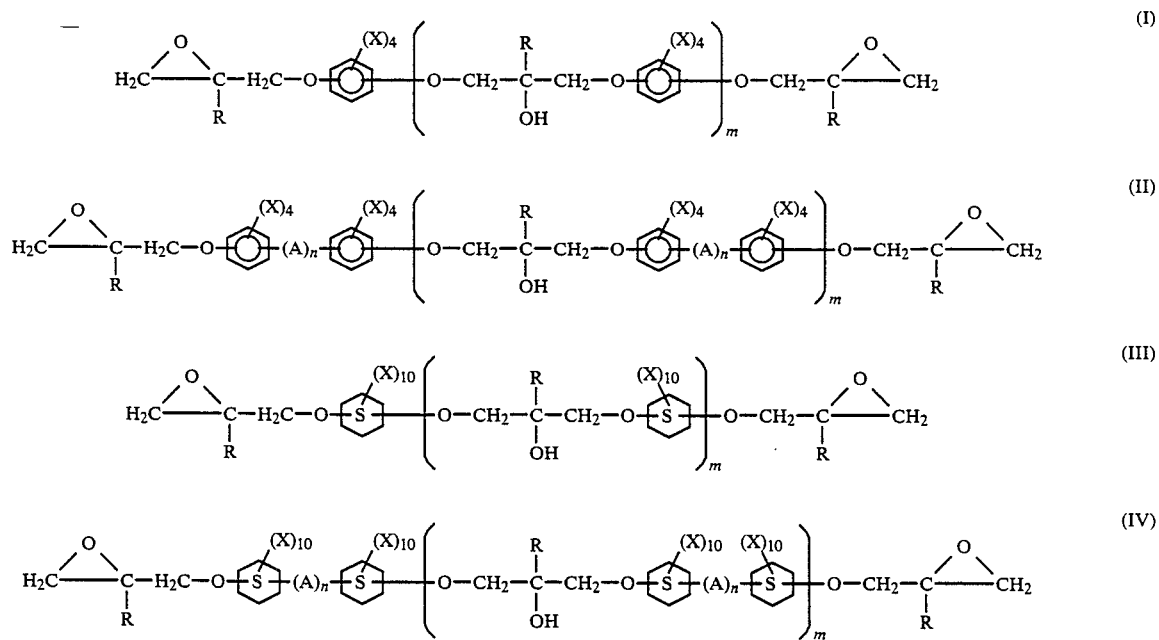

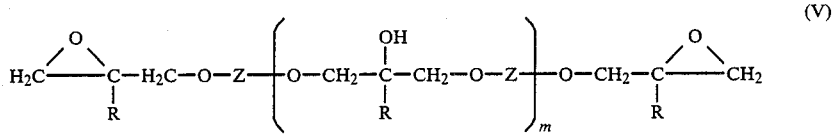

wherein Z is a hydrocarbyl group containing from 1 to about 12 carbon atoms or a

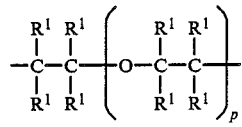

group wherein each $R^1$ is independently hydrogen or a hydrocarbyl group having from 1 to about 6 carbon atoms, and p has a value from 1 to about 100, preferably from 1 to about 25; m and R are as hereinbefore defined. The term mono-, di- or polyetherdiol is intended to also include aliphatic or cycloaliphatic diols or mixtures of said diols.

Suitable diglycidyl ethers of a mono-, di- or polyetherdiol which can be employed herein include, for example, the diglycidyl ethers of ethylene glycol, propylene glycol, diethylene glycol, dipropylene glycol, triethylene glycol, tripropylene glycol, butylene glycol, polyethylene glycols, polypropylene glycols, polybutylene glycols, 1,12-dihydroxydodecane, 1,2-di-hydroxyundecane, 1,6-hexanediol, 1,3-dihydroxy-2,2-dimethyl propane, mixtures thereof and the like. Most preferred are the diglycidyl ethers of ethylene glycol, propylene glycol, polyethylene glycol and polypropylene glycol.

The diglycidyl ethers of a mono-, di- or polyetherdiol may be converted to a phenolic capped adduct suitable for use herein via reaction with a stoichiometric excess of a dihydric phenol such as those represented by formulas VIII and IX. An equivalent ratio of 1:2 or more epoxide groups to phenolic hydroxyl groups is used to prepare the phenolic capped adduct. An equivalent ratio of 1:2.5 to about 1:5 is most preferred. The phenolic capped adduct is preferably prepared using an advancement catalyst with reaction times and temperatures delineated herein for advancement reactions.

Suitable compounds which contain both a group reactive with an epoxide group and a polymerizable ethylenically unsaturated group include compounds wherein said group reactive with an epoxide group is a compound containing a carboxylic acid, hydroxyl or amido group. Suitable compounds which contain both a group reactive with an epoxide group and a polymerizable ethylenically unsaturated group include, for example, the acrylic acids, such as acrylic acid and methacrylic acid; the monoesters of $\alpha,\beta$-unsaturated dicarboxylic acids, such as monomethyl maleate and monobutylfumarate; the alkenylphenols such as p-isopropenylphenol, p-propenylphenol and m-vinylphenol; the hydroxyalkyl acrylates such as 2-hydroxyethyl acrylate, 2-hydroxyethyl methacrylate, 2-hydroxypropyl acrylate, 2-hydroxypropyl methacrylate and the acrylamides such as methacrylamide and acrylamide, any combination thereof and the like. Most preferred as the compound containing a group reactive with an epoxide group and a polymerizable ethylenically unsaturated group is methacrylic acid.

The prereaction (step A) of the diglycidyl ether of a dihydric phenol or diglycidyl ether of a dihydric cyclohexanol or the diglycidyl ether of a dihydric phenol combined withe the diglycidyl ether of a diol or the diglycidyl ether of a dihydric cyclohexanol combined with the diglycidyl ether of a diol and a compound which contains both a group reactive with an epoxide group and a polymerizable ethylenically unsaturated group is performed at a temperature of from about 75° to about 200° C., preferably from about 140° to about 160° C. for from about 15 minutes (900 s) to about 150 minutes (9000 s), preferably for from about 30 minutes (1800 s) to about 60 minutes (3600 s). The prereaction step times and temperatures vary as a function of the type of compound which contains both a group reactive with an epoxide group and a polymerizable ethylenically unsaturated group that is used.

A catalyst may optionally be employed to facilitate reaction of the group reactive with an epoxide group and the epoxide group. Generally, a catalyst is not required and, furthermore, is not desired when said group reactive with an epoxide group is —COOH. It may, however, be beneficial to use a catalyst when said group reactive with an epoxide group is, for example, —OH. Typical of such catalysts useful for this purpose are the advancement catalysts described herein.

Suitable vinyl aromatic monomers which can be employed as component (B-1) in the copolymerization reaction step with the prereaction product of a diglycidyl ether of a dihydric phenol or the diglycidyl ether of a dihydric cyclohexanol or the diglycidyl ether of a dihydric phenol combined with the diglycidyl ether of a diol or the diglycidyl ether of a dihydric cyclohexanol combined with the diglycidyl ether of a diol and a compound containing both a group reactive with an epoxide group and a polymerizable ethylenically unsaturated group include those represented by the following formula VI

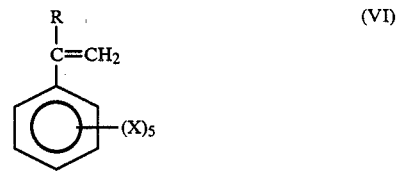

wherein R and X are as hereinbefore defined.

Representative of the vinyl aromatic monomers which can be employed herein are styrene, chlorostyrenes, methylstyrenes, t-butylstyrenes, $\alpha$-methylstyrene, methoxystyrenes, mixtures thereof and the like. Most preferred as the vinyl aromatic monomer is styrene.

Suitable hydroxyalkyl acrylates or methacrylates, alkyl acrylates or methacrylates or mixtures thereof which can be employed as component (B-3) in the copolymerization reaction step with the prereaction product of a diglycidyl ether of a dihydric phenol or the diglycidyl ether of a dihydric cyclohexanol or the diglycidyl ether of a dihydric phenol combined with the diglycidyl ether of a diol or the diglycidyl ether of a dihydric cyclohexanol combined with the diglycidyl ether of a diol and a compound containing both a group reactive with an epoxide group and a polymerizable ethylenically unsaturated group may be chosen according to structure and amount so as to effect the final properties of a cured composition such as, for example, a powder coating. Small amounts (about 0.25 to about 2 percent by weight based on total weight of monomer mixture used) of a hydroxyalkyl acrylate or methacrylate are used to increase adhesion of the powder coating to metal substrates. Larger amounts (about 2.1 to about 15 percent by weight based on total weight of monomer mixture used) of a hydroxyalkyl acrylate or methacrylate increase the gloss of the powder coating. The alkyl acrylates or methacrylates, especially those possessing 8 or more carbon atoms, are used in small amounts (about 1 to about 5 percent by weight based on total weight of monomer mixture used) to decrease the gloss of the powder coating. Larger amounts (about 5.1 to about 15 percent by weight based on total weight of monomer mixture used) of certain alkyl acrylates or methacrylates can be used to also impart modified texture to the powder coating. Combinations of said acrylates and methacryl- ates may also be used. Specific hydroxyalkyl acrylates or methacrylates, alkyl acrylates or methacrylates which can optionally be employed herein include those represented by the following formula VII

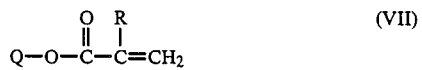

wherein R is as hereinbefore defined and Q is a monovalent hydrocarbyl group having from 1 to about 25 carbon atoms or a hydroxyalkyl group having from 2 to about 25 carbon atoms and may be branched, cyclic or polycyclic. Representative of the hydroxyalkyl acrylates or methacrylates, alkyl acrylates or methacrylates or mixtures thereof which can optionally be employed herein are 2-hydroxyethyl acrylate, 2-hydroxyethyl methacrylate, 2-hydroxypropyl acrylate, cyclohexyl acrylate, lauryl methacrylate, stearyl acrylate, mixtures thereof and the like.

Suitable free radical forming catalysts which can be employed in the copolymerization reaction step with the prereaction product of a diglycidyl ether of a dihydric phenol or the diglycidyl ether of a dihydric cyclohexanol or the diglycidyl ether of a dihydric phenol combined with the diglycidyl ether of a diol or the diglycidyl ether of a dihydric cyclohexanol combined with the diglycidyl ether of a diol and a compound containing both a group reactive with an epoxide group and a polymerizable ethylenically unsaturated group include the azo and diazo compounds as well as the organic peroxides and hydroperoxides. Suitable free radical forming catalysts include, for example, 2,2'-azobisisobutyronitrile, 2,2'-azobis(2,4-dimethyl-4-methoxyvaleronitrile), 1-t-butylazo-1-cyanocyclohexane, t-butylperbenzoate, t-butylperoctoate, t-butylhydroperoxide, di-t-butylperoxide, dicumylperoxide, cumene hydroperoxide, mixtures thereof and the like. An amount of from about 1.0 to about 5.0, preferably from about 2.0 to about 3.0 percent by weight, based on total weight of monomer mixture used, of at least one free radical forming catalyst is employed.

The copolymerization reaction of the prereaction product (A) of a diglycidyl ether of a dihydric phenol or the diglycidyl ether of a dihydric cyclohexanol or the diglycidyl ether of a dihydric phenol combined with the diglycidyl ether of a diol or the diglycidyl ether of a dihydric cyclohexanol combined with the diglycidyl ether of a diol and a compound containing both a group reactive with an epoxide group and a polymerizable ethylenically unsaturated group with a monomer mixture consisting of (B-1) a vinyl aromatic monomer, (B-2) a compound containing both a group reactive with an epoxide group and a polymerizable ethylenically unsaturated group, and, optionally, (B-3) a hydroxyalkyl acrylate or methacrylate, an alkyl acrylate or methacrylate, or a mixture thereof may be completed using a variety of reaction sequences. Generally, the monomer feed (B) containing a free radical forming polymerization catalyst is added to the prereaction product (A) over a period of from about 45 minutes (2700 s) to about 150 minutes (9000 s), preferably from about 75 minutes (4500 s) to about 120 minutes (7200 s) while maintaining a reaction temperature of from about 125° to about 175° C., preferably from about 140° to about 160° C. A post reaction of from about 30 minutes (1800 s) to about 150 minutes (9000 s), preferably from about 45 minutes (2700 s) to about 90 minutes (5400 s) is completed after completion of the monomer feed addition.

It is necessary to maintain an inert atmosphere throughout the copolymerization reaction. This is achieved by blanketing the reaction mixture with nitrogen, argon or some other inert gas. Adequate stirring is required to intimately mix and disperse the reactants.

In an equally preferred process of the present invention, the free radical forming catalyst may be removed as a component of the monomer feed and added to the reaction mixture separately. If this is done, it is generally desirable to maintain concurrent addition of the free radical forming catalyst and the remaining monomer mixture (B-1, B-2 and, optionally, B-3). The rate of this concurrent addition should be adjusted such that an excess of unpolymerized monomer mixture does not accumulate.

As a further embodiment of th present invention, a portion of free radical forming catalyst may be added to the reaction mixture at the end of the monomer mixture addition, more preferably about 15 minutes (900 s) to about 120 minutes (7200 s) after completion of the monomer mixture addition. This is done if unpolymerized monomer mixture is present and allows for completion of the copolymerization reaction.

When a diglycidyl ether of a dihydric phenol combined with the diglycidyl ether of a diol or a diglycidyl ether of a dihydric cyclohexanol combined with the diglycidyl ether of a diol is used to prepare the prereaction product (A), the diglycidyl ether of a diol (A-1-b) may be added to the reaction mixture at any time but preferably is added simultaneously with the diglycidyl ether of a dihydric phenol or the diglycidyl ether of a dihydric cyclohexanol.

The advancement reaction of the aforementioned copolymerization product of the prereaction product (step A) of the diglycidyl ether of a dihydric phenol combined with the diglycidyl ether of a diol or the diglycidyl ether of a dihydric cyclohexanol combined with the diglycidyl ether of a diol and a compound which contains both a group reactive with an epoxide group and a polymerizable ethylenically unsaturated group and the monomer mixture (step B) with a dihydric phenol is performed in the presence of an advancement catalyst. Suitable dihydric phenols include, for example, those represented by the following formulas VIII and IX

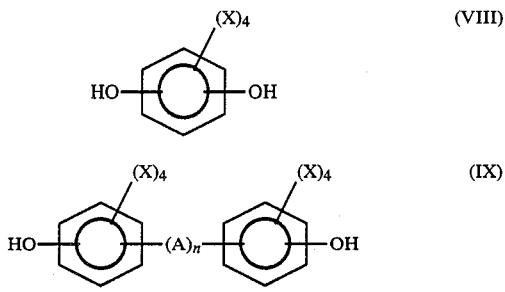

(VIII)

(IX)

wherein X, A and n are as hereinbefore defined. Representative of the bisphenols are resorcinol, hydroquinone, catechol, bisphenol A (4,4'-isopropylidenediphenol), bis(4,4'-dihydroxyphenyl)methane, 2,2'-bis(4-hydroxyphenyl)pentane, 3,3',5,5'-tetramethyl-4,4'-dihydroxy-diphenyl, 4,4'-dihydroxydiphenyl sulfone, 4,4'-dihydroxybenzophenone, 3,3',5,5'-tetrabromo-4,4'-isopropylidenediphenol, 4,4'-bis(p-hydroxyphenyl)diphenyl ether, 4,4'-dihydroxydiphenyl sulfide, mixtures thereof and the like. Most preferred as the bisphenol is bisphenol A.

Suitable advancement catalysts which can be employed in the process of the present invention include most any catalyst which will catalyze the reaction between a vicinal epoxy group and a phenolic hydroxyl group. Such catalysts include, for example, those disclosed in U.S. Pat. Nos. 3,306,872; 3,341,580; 3,379,684; 3,477,990; 3,547,881; 3,637,590; 3,843,605; 3,948,855; 3,956,237; 4,048,141; 4,093,650; 4,131,633; 4,132,706; 4,171,420; 4,177,216 which are incorporated herein by reference.

Particularly suitable catalysts are the quaternary phosphonium and ammonium compounds such as, for example, ethyltriphenylphosphonium chloride, ethyltriphenylphosphonium bromide, ethyltriphenylphosphonium iodide, ethyltriphenylphosphonium acetate, ethyltriphenylphosphonium acetate.acetic acid complex, ethyltriphenylphosphonium phosphate, tetrabutylphosphonium chloride, tetrabutylphosphonium bromide, tetrabutylphosphonium iodide, tetrabutylphosphonium acetate, tetrabutylphosphonium acetate.acetic acid complex, butyltriphenylphosphonium tetrabromobisphenate, butyltriphenylphosphonium bisphenate, butyltriphenylphosphonium bicarbonate, benzyltrimethylammonium chloride, tetramethylammonium hydroxide, mixtures thereof and the like.

The advancement reaction of the aforementioned copolymerization product of the prereaction product (step A) of the diglycidyl ether of a dihydric phenol or the diglycidyl ether of a dihydric cyclohexanol and a compound which contains both a group reactive with an epoxide group and a polymerizable ethylenically unsaturated group and the monomer mixture (step B) with a dihydric phenol (formulas VIII, IX) and a diglycidyl ether of a diol or a phenolic capped adduct of a diglycidyl ether of a diol is performed in the presence of an advancement catalyst using methods hereinbefore delineated.

It is also operable, although less preferred, to perform the advancement reaction of the aforementioned copolymerization product of the prereaction product of the diglycidyl ether or a dihydric phenol or the diglycidyl ether of a dihydric cyclohexanol combined with the diglycidyl ether of a diol and a compound which contains both a group reactive with an epoxide group (Step A) and a polymerizable ethylenically unsaturated group and the monomer mixture (Step B) with a dihydric phenol (formulas VIII or IX) and a diglycidyl ether of a diol or a phenolic capped adduct of a diglycidyl ether of a diol in the presence of an advancement catalyst using methods hereinbefore delineated. In this particular process configuration, the previously specified prerequisite amount of diglycidyl ether of a diol is thus distributed between the prereaction and the advancement reaction steps in any proportion desired.

After completion of either the copolymerization reaction (I) or the advancement reaction (II), it is generally beneficial, although not required, to subject the reaction product to a vacuum stripping step. This is accomplished by pulling a vacuum on the reactor, thus removing and condensing any materials which volatilize from the reaction product.

In a variation on this vacuum stripping step, various modifying agents or additives, such as, for example, flow control agents, gloss control agents, pigments, texture control additives, air release agents, mixtures thereof and the like may be added to the reaction product prior to the vacuum stripping step. This allows for removal of any volatile components contributed by said additives.

The powder coating formulations of the present invention are prepared using the aforesaid epoxy resin compositions and a suitable curing agent therefor. Said curing agents should be substantially non-sintering and exhibit latency at the formulating temperatures and conditions employed. Suitable such curing agents are described in the *Handbook of Epoxy Resins,* by Lee and Neville, 1967, McGraw-Hill which is incorporated herein by reference. Representative of these curing agents are the boron trifluoride-amine complexes, polycarboxylic acids or anhydrides, the guanamines, guanidines, hydrazines, dihydrazides, melamines, substituted ureas and biguanides, such as, dicyandiamide or dicyandiamide derivatives. Most preferred as the curing agent is dicyandiamide.

Epoxy polyester hybrid powder coating formulations of the present invention are prepared using the aforesaid epoxy resin compositions and a suitable carboxylic acid and/or hydroxyl functional polyester as the curing agents. Representative of this technology are the epoxy polyester hybrid powder coating formulations taught by Hefner, Jr. et al in copending application Ser. No. 791,176 filed Dec. 24, 1985.

Formulating methods well known to the prior art are employed to prepare the powder coating formulations of the present invention. Preparation of typical epoxy resin based powder coating formulations are described in *Fundamentals of Powder Coating* by Miller and Taft, 1974, Society of Manufacturing Engineers, Dearborn, Mich. which is incorporated herein by reference.

In the general method of preparation, the solid epoxy resin product is flaked or ground then dry mixed or blended with a non-sintering curing agent and optionally, one or more curing agent accelerators or catalysts, particulate fillers, pigments, flow control agents, gloss control additives, texture control additives and air release agents. The dry mixed product is then hot melt blended typically by use of a kneading-type extruder.

The extruded product passes through chilled rollers and is then recovered and crushed to a rough powder. Further grinding to a fine powder is accomplished via use of a high speed hammer mill or other type of grinding equipment. The resulting fine powder is subjected to a size classification step to recover the desired range of product particle size. The desired product size distribution for the product may vary depending on the intended end use of the product, but generally, sizes between about 80 mesh to about 325 mesh are most desired. Well known methods that are suitable for use in size classifying powder coating formulations include screening and air classification.

The resulting powder coating formulation is applied to the substrate to be coated using methods well known to the prior art. These methods are delineated in detail by the aforementioned Miller and Taft reference and include powder dusting, fluidized bed processes, electrostatic powder spraying, electrostatic fluidized bed processes, and others.

The powder coated article is cured using methods and conditions well known to the prior art. This typically involves heating in an oven for an amount of time sufficient to complete the cure. When dicyandiamide is the curing agent and 2-methylimidazole is the curing agent accelerator used with the epoxy resin compositions of the present invention, curing times of about 5 minutes to about 30 minutes at a reaction temperature of from about 150° to about 220° C. are generally sufficient.

The powder coating formulation optionally, although preferably, contains one or more curing agent accelerators or catalysts. Suitable such curing agent accelerators or catalysts are described in the aforementioned *Handbook of Epoxy Resins* and *Fundamentals of Powder Coating* references. Representative of these curing agent accelerators or catalysts are the amino substituted pyridines, imidazoles, metallic salts, tertiary amines, phenols, mixtures thereof and the like. Most preferred as the curing agent accelerator for use with a dicyandiamide curing agent is 2-methylimidazole.

The powder coating formulation optionally, although preferably, contains one or more particulate fillers. Fillers are used in powder coatings for a wide range of purposes, primary of which is economic, i.e. as a less expensive diluent. Other properties imparted by fillers can include one or more of the following: handling and processing properties, impact modification, dimensional stability, moisture and chemical resistance, flame resistance, modified thermal conductivity, modified electrical properties, modified rheology, color modification and texture modification. Suitable such fillers are described in *Non-Fibrous Fillers for Epoxy Resin Formulations* presented at the 7th Electrical Insulation Conference, Chicago, Ill., Oct. 15-19, 1967 by D. A. Shimp. Representative of these fillers are barytes (BaSO$_4$), titanium dioxide, carbon black, silica flour, calcium carbonate, mixtures thereof and the like. The particle size distribution, shape, chemical composition, surface area and use level, i.e. resin to filler ratio, can be adjusted singularly or collectively to change the resultant cured powder coating. Simple preliminary experiments within the normal capability of those skilled in the art are ordinarily performed to aid in filler choice.

The powder coating formulation optionally contains one or more pigments. Said pigments are typically used to add color to the cured powder coating. Suitable such pigments are described in *Pigments for Colouring Epoxy Powder Coatings* by Maltman and Deverell-Smith in Pigment and Resin Technology, November 1973, pp. 15-19 which is incorporated herein by reference.

The powder coating formulation optionally, although preferably, contains one or more flow control agents. Flow control agents are used in powder coatings to adjust the rheological properties of the total powder coating formulation thus insuring uniform coating film thickness, wet-out and coating of edges. Suitable such flow control agents are described in *Acrylic Flow Control Agents for the Coating Industry* by Skora in Polymers Paint and Colour Journal, Sept. 5, 1979, pp. 867-870 which is incorporated herein by reference. Most preferred as the flow control agents are the polyacrylates such as, for example, ethyl acrylate and 2-ethylhexyl acrylate copolymer, and poly(butyl acrylate).

The powder coating formulation optionally contains one or more texture control additives. Texture control additives are used in powder coatings to modify the surface characteristics of the cured powder coating. Materials which provide smooth or rough surface finishes may be employed. Glass microspheres, metal powders and polymeric powders are examples of the types of additives capable of modifying the powder coating surface to a textured finish.

The powder coating formulation optionally contains one or more air release agents. Said agents are used in powder coatings to alleviate surface defects, such as pinholes in the cured powder coating, induced by air entrainment. A most preferred air release agent is benzoin, as described in *Surface Coatings, Vol. 2—Paints and Their Application* by The Oil and Colour Chemists' Association, Australia, published by Chapman and Hall, 1984, p. 598 which is incorporated herein by reference.

The powder coating formulation optionally contains one or more gloss control additives. Gloss control additives are used to reduce the high degree of reflected light from the typical cured epoxy resin surface. Suitable such gloss control agents are certain amorphous silicas, silicic acid and the curing agent system consisting of a salt of a polycarboxylic acid and a cyclic amidine as taught by U.S. Pat. No. 3,947,384 which is incorporated herein by reference.

Other additives or adjuvants may be incorporated into the powder coating formulations of the present invention for their known and intended use therein. One such additive is a slip aid, as described in the aforementioned *Surface Coatings* reference.

The cured product of the present invention is a powder coating over a substrate such as steel which provides a smooth finish, low gloss surface with high impact strength.

The following examples are illustrative of the present invention and are not to be construed as to limiting the scope thereof in any manner.

EXAMPLE 1

Polystyrene Modified Epoxy Resin with 5% of the Diglycidyl Ether of Bisphenol A Substituted with Polypropylene Glycol Diglycidyl Ether During the Prereaction A commercial grade (D.E.R. ® 383, The Dow Chemical Company) diglycidyl ether of bisphenol A (575 g, 3.144 epoxide equivalents) having an epoxide equivalent weight (EEW) of 182.9, a commercial grade (D.E.R. ® 732, The Dow Chemical Company) polypropylene glycol diglycidyl ether (49.14 g, 0.166 epoxide equivalent) having an EEW of 296 and glacial methacrylic acid (2.86 g, 0.033 mole) were charged to a 2-liter, 5-neck round bottom flask fitted with a water-cooled condenser, nitrogen purge, addition funnel, thermometer and stirrer. Heating to 150° C. was initiated on the stirred solution. Forty-four minutes (2640 s) later the reactor temperature reached 145° C. and a nitrogen purge was initiated. Two minutes (120 s) later the 150° C. temperature was reached. The first aliquot of monomer mixture, a mixture of styrene (249.65 g, 2.39 moles), glacial methacrylic acid (2.15 g, 0.025 mole) and tertiary butyl perbenzoate (6.24 g, 0.031 mole) was charged to the addition funnel and added dropwise to the stirred solution. After forty-four minutes (2640 s), the addition of the first aliquot of monomer mixture was complete and the second aliquot, a mixture of styrene (249.65 g, 2.39 moles), glacial methacrylic acid (2.15 g, 0.025 mole) and tertiary butyl perbenzoate (6.24 g, 0.031 mole), was charged to the addition funnel and added dropwise to the stirred solution. The reactor temperature was maintained between 145° C. and 155° C. throughout the monomer mixture addition. Forty-seven minutes (2820 s) later the addition of the second aliquot of monomer mixture was complete. Post-reaction of the stirred solution was continued for thirty minutes (1800 s) at 150° C. After thirty minutes (1800 s) at 150° C., tertiary butyl perbenzoate (1.25 g, 0.0062 mole) was charged to the stirred solution. After an additional thirty minutes (1800 s) at 150° C., a vacuum was drawn to remove unreacted styrene and other lights. During the vacuum stripping, 2.0 ml of unreacted styrene and other lights were recovered in an overhead cold trap. After thirty minutes (1800 s) of vacuum stripping at 150° C., bisphenol A (162.8 g, 0.71 mole) was charged to the stirred solution. Three minutes (180 s) later, the reactor temperature had dropped to 133° C. with complete dissolution of the bisphenol A in the resin solution. An advancement catalyst (ethyltriphenylphosphonium acetate.acetic acid complex, 1 g, 70% in methanol) was added to the reactor which was then reheated to 150° C. Seven minutes (420 s) later, the reactor reached 150° C. and heating was discontinued. A maximum exotherm of 180° C. resulted six minutes (360 s) later. The reactor was allowed to cool to 175° C. where it was held for one hour (3600 s) after the maximum exotherm. The polystyrene modified epoxy resin product was recovered as a pale-yellow colored, slightly opaque, brittle solid with a final epoxide equivalent weight of 721.

EXAMPLE 2

Polystyrene Modified Epoxy Resin with 5% of the Diglycidyl Ether of Bisphenol A Substituted with Polypropylene Glycol Diglycidyl Ether After Monomer Mixture Addition A commercial grade (D.E.R.® 383, The Dow Chemical Company) diglycidyl ether of bisphenol A (575 g, 3.144 epoxide equivalents) having an epoxide equivalent weight (EEW) of 182.9 and glacial methacrylic acid (2.86 g, 0.033 mole) were charged to a 2-liter, 5-neck round bottom flask fitted with a water-cooled condenser, nitrogen purge, addition funnel, thermometer and stirrer. Heating to 150° C. was initiated on the stirring solution. Forty-seven minutes (2820 s) later, the reactor temperature reached 145° C. and a nitrogen purge was initiated. Three minutes (180 s) later, the 150° C. temperature was reached. The first aliquot of monomer mixture, a mixture of styrene (249.65 g, 2.39 moles), glacial methacrylic acid (2.15 g, 0.025 mole) and tertiary butyl perbenzoate (6.24 g, 0.031 mole) was charged to the addition funnel and added dropwise to the stirred solution. After fifty minutes (3000 s), the addition of the first aliquot of monomer mixture was complete and the second aliquot, a mixture of styrene (249.65 g, 2.39 moles), glacial methacrylic acid (2.15 g, 0.025 mole) and tertiary butyl perbenzoate (6.24 g, 0.031 mole), was charged to the addition funnel and added dropwise to the stirred solution. The reactor temperature was maintained between 145° C. and 155° C. throughout the monomer mixture addition. Forty-three minutes (2580 s) later, the addition of the second aliquot of monomer mixture was complete. Post-reaction of the stirred solution was continued for thirty minutes (1800 s) at 150° C. After fifteen minutes (900 s) at 150° C., tertiary butyl perbenzoate (1.25 g, 0.0062 mole) was charged to the stirred solution. After an additional fifteen minutes (900 s) at 150° C. a vacuum was drawn to remove unreacted styrene and other lights. During the vacuum stripping, 7.5 ml of unreacted styrene and other lights were recovered in an overhead cold trap. After sixty minutes (3600 s) of vacuum stripping at 150° C., a commercial grade (D.E.R.® 732, The Dow Chemical Company) polypropylene glycol diglycidyl ether (49.14 g, 0.166 epoxide equivalent) having an EEW of 296 and bisphenol A (162.8 g, 0.71 mole) were charged to the stirred solution. Six minutes (360 s) later, the reactor temperature had dropped to 130° C. with complete dissolution of the bisphenol A in the resin solution. An advancement catalyst (ethyltriphenylphosphonium acetate.acetic acid complex, 1 g, 70% in methanol) was added to the reactor which was then reheated to 150° C. Eight minutes (480 s) later, the reactor reached 150° C. and heating was discontinued. A maximum exotherm of 180° C. resulted seven minutes (420 s) later. The reactor was allowed to cool to 175° C. where it was held for one hour (3600 s) after the maximum exotherm. The polystyrene modified epoxy resin product was recovered at room temperature (25° C.) as a pale-yellow colored, slightly opaque, brittle solid with a final epoxide equivalent weight of 737.

EXAMPLE 3

Polystyrene Modified Epoxy Resin with 5% of the Diglycidyl Ether of Bisphenol A Substituted with Polypropylene Glycol Diglycidyl Ether During the Advancement Step Post Reaction A commercial grade (D.E.R.® 383, The Dow Chemical Company) diglycidyl ether of bisphenol A (575 g, 3.144 epoxide equivalents) having an epoxide equivalent weight (EEW) of 182.9 and glacial methacrylic acid (2.86 g, 0.033 mole) were charged to a 2-liter, 5-neck round bottom flask fitted with a water-cooled condenser, nitrogen purge, addition funnel, thermometer and stirrer. Heating to 150° C. was initiated on the stirring solution. Forty-two minutes (2520 s) later, the reactor temperature reached 145° C. and a nitrogen purge was initiated. Three minutes (180 s) later, the 150° C. temperature was reached. The first aliquot of monomer mixture, a mixture of styrene (249.65 g, 2.39 moles), glacial methacrylic acid (2.15 g, 0.025 mole) and tertiary butyl perbenzoate (6.24 g, 0.031 mole) was charged to the addition funnel and added dropwise to the stirred solution. After forty-five minutes (2700 s), the addition of the first aliquot of monomer mixture was complete and the second aliquot, a mixture of styrene (249.65 g, 2.39 moles), glacial methacrylic acid (2.15 g, 0.025 mole) and tertiary butyl perbenzoate (6.24 g, 0.031 mole), was charged to the addition funnel and added dropwise to the stirred solution. The reactor temperature was maintained between 145° C. and 155° C. throughout the monomer mixture addition. Forty-three minutes (2580 s) later, the addition of the second aliquot of monomer mixture was complete. Post-reaction of the stirred solution was continued for fifteen minutes (900 s) at 150° C. After fifteen minutes (900 s) at 150° C., tertiary butyl perbenzoate (1.25 g, 0.0062 mole) was charged to the stirred solution. After an additional forty-five minutes (2700 s) at 150° C. a vacuum was drawn to remove unreacted styrene and other lights. During the vacuum stripping, 2.7 ml of unreacted styrene and other lights were recovered in an overhead cold trap. After forty-two minutes (2520 s) of vacuum stripping at 150° C., bisphenol A (162.8 g, 0.71 mole) was charged to the stirred solution. Three minutes (180 s) later, the reactor temperature had dropped to 130° C. with complete dissolution of the bisphenol A in the resin solution. An advancement catalyst (ethyltriphenylphosphonium acetate.acetic acid complex, 1 g, 70% in methanol) was added to the reactor which was then reheated to 150° C. Nine minutes (540 seconds) later, the reactor reached 150° C. and heating was discontinued. A maximum exotherm of 181° C. resulted seven minutes (420 s) later. The reactor was allowed to cool to 175° C. where it was held for forty-five minutes (2700 s) after the maximum exotherm. A commercial grade (D.E.R.® 732, The Dow Chemical Company) polypropylene glycol diglycidyl ether (49.14 g, 0.166 epoxide equivalent) was added to the advanced resin mixture. The reactor was held at 175° C. for fifteen minutes (900 s) following the polypropylene glycol diglycidyl ether addition. The polystyrene modified epoxy resin product was recovered at room temperature (25° C.) as a pale-yellow colored, slightly opaque, brittle solid with a final epoxide equivalent weight of 733.

EXAMPLE 4

Polystyrene Modified Epoxy Resin with 5% of the Diglycidyl Ether of Bisphenol A Substituted with Bisphenol A Capped Polypropylene Glycol Diglycidyl Ether After Monomer Mixture Addition

A. Synthesis of Phenolic Capped Aliphatic Epoxy Resin

A portion of a commercial grade (D.E.R. ® 732, The Dow Chemical Company) diglycidyl ether of polypropylene glycol (59.20 g, 0.20 epoxide equivalent) having an epoxide equivalent weight (EEW) of 296 was added to a reactor and heated to 150° C. with stirring under a nitrogen atmosphere. Bisphenol A (68.49 g, 0.60 hydroxyl equivalent) was added to the reactor followed by cooling to 100° C. At this time, ethyltriphenylphosphonium acetate.acetic acid complex catalyst (0.192 g, 0.15 percent by weight) was added to the reactor followed by heating to 180° C. over a 16 minute (960 s) period. Once the 180° C. temperature was achieved, the reactor was allowed to cool over a 10 minute (600 s) period to 150° C. then held at this temperature for 64 minutes (3840 s). The product was recovered as a light yellow colored, transparent solid at room temperature (25° C.) with a residual percent epoxide content of 0.34 (12,647 EEW).

B. Synthesis of a Polystyrene Modified Epoxy Resin Utilizing a Portion of the Phenolic Capped Aliphatic Epoxy Resin A commercial grade (D.E.R.® 383, The Dow Chemical Company) diglycidyl ether of bisphenol A (489.72 g, 2.679 epoxide equivalents) having an epoxide equivalent weight (EEW) of 182.8 and glacial methacrylic acid (2.86 g, 0.033 mole) were charged to a 2-liter, 5-neck round bottom flask fitted with a water-cooled condenser, nitrogen purge, addition funnel, thermometer and stirrer. Heating to 150° C. was initiated on the stirred solution. Thirty-two minutes (1920 s) later, the reactor temperature reached 145° C. and a nitrogen purge was initiated. Two minutes (120 s) later, the 150° C. temperature was reached. The first aliquot of monomer mixture, a mixture of styrene (212.58 g, 2.04 moles), glacial methacrylic acid (1.82 g, 0.021 mole) and tertiary butyl perbenzoate (5.315 g, 0.027 mole) was charged to the addition funnel and added dropwise to the stirred solution. After forty-six minutes (2760 s), the first aliquot of monomer mixture addition was complete and the second aliquot, a mixture of styrene (212.58 g, 2.04 moles), glacial methacrylic acid (1.82 g, 0.021 mole) and tertiary butyl perbenzoate (5.315 g, 0.027 mole), was charged to the addition funnel and added dropwise to the stirred solution. The reactor temperature was maintained between 145° C. and 155° C. throughout the monomer mixture addition. Forty-two minutes (2520 s) later, the second aliquot of monomer mixture addition was complete. Post-reaction of the stirred solution was continued for thirty minutes (1800 s) at 150° C. After thirty minutes (1800 s) at 150° C., tertiary butyl perbenzoate (1.06 g, 0.0054 mole) was charged to the stirred solution. After an additional thirty minutes (1800 s) at 150° C., a vacuum was drawn to remove unreacted styrene and other lights. During the vacuum stripping, 4.85 ml of unreacted styrene and other lights were recovered in an overhead cold trap. After thirty minutes (1800 s) of vacuum stripping at 150° C., 90 g of the phenolic capped aliphatic epoxy resin product (part A) was charged to the stirred solution concurrently with bisphenol A (90.28 g, 0.394 mole). Ten minutes (600 s) later, the reactor temperature had dropped to 134° C. with complete dissolution of the bisphenol A in the resin solution. An advancement catalyst (ethyltriphenylphosphonium acetate.acetic acid complex, 0.84 g, 70% in methanol) was added to the reactor which was then reheated to 150° C. Six minutes (360 s) later, the reactor reached 150° and heating was discontinued. A maximum exotherm of 180° C. Resulted five minutes (300 s) later. The reactor was allowed to cool to 175° C. where it was held for one hour (3600 s) after the maximum exotherm. The polystyrene modified epoxy resin product was recovered at room temperature (25° C.) as a pale-yellow colored, slightly opaque, brittle solid with a final epoxide equivalent weight of 738.

EXAMPLE 5

Polystyrene Modified Epoxy Resin with 10% of the Diglycidyl Ether of Bisphenol A Substituted with Polypropylene Glycol Diglycidyl Ether During the Prereaction A commercial grade (D.E.R.® 383, The Dow Chemical Company) diglycidyl ether of bisphenol A (540.99 g, 2.979 epoxide equivalents) having an epoxide equivalent weight (EEW) of 181.6, a commercial grade (D.E.R. ® 732, The Dow Chemical Company) polypropylene glycol diglycidyl ether (97.98 g, 0.331 epoxide equivalent) having an EEW of 296 and glacial methacrylic acid (2.86 g, 0.033 mole) were charged to a 2-liter, 5-neck round bottom flask fitted with a water-cooled condenser, nitrogen purge, addition funnel, thermometer and stirrer. Heating to 150° C. was initiated on the stirred solution. Forty-seven minutes (2820 s) later, the reactor temperature reached 145° C. and a nitrogen purge was initiated. Five minutes (300 s) later, the 150° C. temperature was reached. The first aliquot of monomer mixture, a mixture of styrene (255.59 g, 2.45 moles), glacial methacrylic acid (2.15 g, 0.025 mole) and tertiary butyl perbenzoate (6.39 g, 0.032 mole) was charged to the addition funnel and added dropwise to the stirred solution. After thirty-eight minutes (2280 s), the first aliquot of monomer mixture addition was complete and the second aliquot, a mixture of styrene (255.59 g, 2.45 moles), glacial methacrylic acid (2.15 g, 0.025 mole) and tertiary butyl perbenzoate (6.39 g, 0.032 mole), was charged to the addition funnel and added dropwise to the stirred solution. The reactor temperature was maintained between 145° C. and 155° C. throughout the monomer mixture addition. Fifty-one minutes (3060 s) later, the second aliquot of monomer mixture addition was complete. Postreaction of the stirred solution was continued for thirty-two minutes (1920 s) at 150° C. After thirty-two minutes (1920 s) at 150° C., tertiary butyl perbenzoate (1.28 g, 0.0064 mole) was charged to the stirred solution. After twenty-eight minutes (1680 s) at 150° C., a vacuum was drawn to remove unreacted styrene and other lights. During the vacuum stripping, 7.0 ml of unreacted styrene and other lights were recovered in an overhead cold trap. After thirty minutes (1800 s) of vacuum stripping at 150° C., bisphenol A (158.97 g, 0.69 mole) was charged to the stirred solution. Four minutes (240 s) later, the reactor temperature had dropped to 134° C. with complete dissolution of the bisphenol A in the resin solution. An advancement catalyst (ethyltriphenylphosphonium acetate.acetic acid complex, 1.0 g, 70% in methanol) was added to the reactor which was then reheated to 150° C. Seven minutes (420 s) later, the reactor reached 150° C. and heating was discontinued. A maximum exotherm of 176° C. resulted four minutes (240 s) later. The reactor was allowed to cool to 175° C. where it was held for one hour (3600 s) after the maximum exotherm. The polystyrene modified epoxy resin product was recovered at room temperature (25° C.) as a pale-yellow colored, slightly opaque, brittle solid with a final epoxide equivalent weight of 740.

COMPARATIVE EXPERIMENT A

Polystyrene Modified Epoxy Resin—Low Gloss Standard

A commercial grade (D.E.R. ® 383, The Dow Chemical Company) diglycidyl ether of bisphenol A (600 g, 3.31 epoxide equivalents) having an epoxide equivalent weight (EEW) of 181.6 and glacial methacrylic acid (2.86 g, 0.033 mole) were charged to a 2-liter, 5-neck round bottom flask fitted with a water-cooled condenser, nitrogen purge, addition funnel, thermometer and stirrer. Heating to 150° C. was initiated on the stirred solution. Forty-two minutes (2520 s) later, the reactor temperature reached 145° C. and a nitrogen purge was initiated. Three minutes (180 s) later, the 150° C. temperature was reached. The first aliquot of monomer mixture, a mixture of styrene (240 g, 2.3 moles), glacial methacrylic acid (2.15 g, 0.025 mole) and tertiary butyl perbenzoate (6 g, 0.03 mole) was charged to the addition funnel and added dropwise to the stirred solution. After forty-seven minutes (2820 s), the addition of the first aliquot of monomer mixture was complete and the second aliquot, a mixture of styrene (240 g, 2.3 moles), glacial methacrylic acid (2.15 g, 0.025 mole) and tertiary butyl perbenzoate (6 g, 0.03 mole), was charged to the addition funnel and added dropwise to the stirred solution. The reactor temperature was maintained between 145° C. and 155° C. throughout the monomer mixture addition. Forty minutes (2400 s) later, the addition of the second aliquot of monomer mixture was complete. Post-reaction of the stirred solution was continued for thirty minutes (1800 s) at 150° C. After thirty minutes (1800 s) at 150° C., tertiary butyl perbenzoate (1.2 g, 0.006 mole) was charged to the stirred solution. A slight exotherm to 153° C. was noted. After an additional thirty minutes (1800 s) at 150° C., a vacuum was drawn to remove unreacted styrene and other lights. During the vacuum stripping, 8.5 ml of unreacted styrene and other lights were recovered in an overhead cold trap. After thirty minutes (1800 s) of vacuum stripping at 150° C., bisphenol A (162.8 g, 0.71 mole) was charged to the stirred solution. Three minutes (180 s) later, the reactor temperature had dropped to 138° C. with complete dissolution of the bisphenol A in the resin solution. An advancement catalyst (ethyltriphenylphosphonium acetate.acetic acid complex, 1 g, 70% in methanol) was added to the reactor which was then reheated to 150° C. Three minutes (180 s) later, the reactor reached 150° C. and heating was discontinued. A maximum exotherm of 173° C. resulted six minutes (360 s) later. The reactor was heated to 175° C. where it was held for one hour (3600 s) after the maximum exotherm. The polystyrene modified epoxy resin product was recovered at room temperature (25° C.) as a pale-yellow colored, slightly opaque, brittle solid with a final epoxide equivalent weight of 708.

EXAMPLE 6

Cone and Plate Viscosity Determination of Powder Coating Resins

Cone and plate viscosity measurements were determined for the resins of Examples 1–5 and Comparative Experiment A utilizing an I.C.I. Cone and Plate Viscometer, Research Equipment (London) Ltd.

Viscosity measurements were taken at 150° C. and 175° C. A 0.4 g sample of each solid resin was placed on the heated plate and evaluated with a size 100 cone. The Cone and Plate viscosity values for Examples 1–5 and Comparative Experiment A are reported in Table I.

EXAMPLE 7

Kinematic Viscosity Determination of Powder Coating Resins

Kinematic viscosity measurements were determined for the resin of Example 1 and a standard low gloss polystyrene modified epoxy resin prepared using the method of Comparative Experiment A utilizing Cannon-Fenske Routine Viscometers size 700.

Viscosity measurements were taken at 150° C. An eleven gram sample of each solid resin was placed into a size 700 viscometer. The viscometer was then inserted in to a 150° C. constant temperature oil bath. The viscometer was allowed to equilibrate at 150° C. for at least sixty minutes (3600 s) prior to viscosity measurement. The molten resin was free of all air bubbles prior to viscosity measurement. The Kinematic viscosity values for Example 1 and the low gloss polystyrene modified epoxy resin prepared using the method of Comparative Experiment A are reported in Table IV.

EXAMPLE 8

Preparation of Powder Coating Formulations

Portions of each of the epoxy resins from Examples 1-5 and Comparative Experiment A were coarse ground in a Wellex Grinder. Formulation weights as per Table II, of the epoxy resin, dicyandiamide, a mixture of 17% by weight 2-methylimidazole and 83% by weight dicyandiamide, Modaflow II, and filler, were placed in a plastic bag, sealed and dry mixed to a homogeneous blend. The dry-mixed formulations were then extruded in a Buss-Condux PLK 46 single screw extruder (equipped with a 46 mm diameter kneader screw operated at 120 rpm). For the resin formulations of Examples 1-5, Zone 1 was set at 50° C. and Zone 2 was set to 100° C.; for the resin formulation of Comparative Experiment A, Zone 1 was set at 60° C. and Zone 2 was set at 100° C. The extrudate was passed through BCI Chill Rolls (6½" (165.1 mm) diameter, cooled and crushed. The crushed extrudate was then coarse ground in a Brinkman Centrifugal Grinding Mill utilizing the 12-tooth attachment and then fine ground using the 12-tooth attachment and a 0.75 mm screen over the grinding teeth; dry ice was utilized as a coolant to minimize sintering and resin melt in the fine grinding step. The finely ground extrudate was sieved through No. 140 (150 mesh, 106 μm) standard test sieves (wire cloth). The −150 mesh powder coating formulations were applied via electrostatic spray with a Gema Ag Type 710 Laboratory Unit (set at 60-70 kV) on to 4"×12"×20 gauge (101.6 mm×304.8 mm×0.529 mm) cold rolled steel, clena treatment Parker test panels (Parker division, Hooker Chemicals and Plastics Corporation). The electrostatically coated panels were set in a Gallenkamp convection-type oven and cured at 180° C. (356° F.) for twenty minutes (1200 s). After removal from the oven, the panels were cooled and evaluated via the following test methods: coating thickness was determined per ASTM D1186 by utilizing a Fischer PermaScope ES film thickness tester. Surface gloss was determined per ASTM D523 (DIN 67530) using a Mallinckrodt Multi Gloss gloss meter. Gardner forward and reverse impact strengths were determined 24 hours (86,400 s) after spray-up as per ASTM D2794 using a Gardner "Coverall" Bend and Impact Tester, 46 inch (1.17 m) tube length, 0-160 in.-lb. tester, with a four pound (1.81 kg), one-half inch (12.7 mm) diameter cone. Visualization of any surface cracks at the impact sites was facilitated by application of an acidified copper sulfate ($CuSO_4$) solution for a period of 15 minutes (900 s). Impact areas were observed for copper deposits or iron-rust stains immediately after exposure to the copper sulfate solution.

Film thickness, surface gloss and Gardner impact strength values of the cured powder coatings prepared using the epoxy resins of Examples 1-5 and Comparative Experiment A are reported in Table II.

COMPARATIVE EXPERIMENT B

Preparation of Powder Coating Formulation Using Epoxy Resin Standard and 45 pbw $TiO_2$ A commercial grade (D.E.R. ® 662UH, The Dow Chemical Company) diglycidyl ether of bisphenol A having a epoxide equivalent weight (EEW) of 714 was used to prepare a powder coating formulation using the method of Example 8 substituting titanium dioxide ($TiO_2$, DuPont R-900) for the $BaSO_4$ at 45 percent by weight of the total formulation. Cured powder coated panels were prepared and tested using the methods of Example 8. The results are reported in Table III.

COMPARATIVE EXPERIMENT C

Preparation of Powder Coating Formulating Using Standard Low Gloss Epoxy Resin and 45 pbw $TiO_2$ A portion of resin from Comparative Experiment A was used to prepare a powder coating formulation using the method of Example 8 substituting titanium dioxide ($TiO_2$, DuPont R-900) for the $BaSO_4$ at 45 percent by weight of the total formulation. Cured powder coated steel panels were prepared and tested using the methods of Example 8. The results are reported in Table III.

EXAMPLE 9

Preparation of Powder Coating Formulation Using 45 pbw $TiO_2$

A portion of resin from Example 5 was used to prepare a powder coating formulation using the method of Example 8 substituting titanium dioxide ($TiO_2$, DuPont R-900) for the $BaSO_4$ at 45 percent by weight of the total formulation. Cured powder coated steel panels were prepared and tested using the methods of Example 8. The results are reported in Table III.

TABLE I

| DESIGNATION OF EPOXY RESIN | CONE AND PLATE VISCOSITY cks ($m^2/s$) | | EEW |
|---|---|---|---|
| | 150° C. | 175° C. | |
| Example 1 | 2400 (0.0024) | 850 (0.00085) | 721 |
| Example 2 | 3200 (0.0032) | 1000 (0.001) | 737 |
| Example 3 | 3000 (0.003) | 1000 (0.001) | 733 |
| Example 4 | 3400 (0.0034) | 900 (0.0009) | 738 |
| Example 5 | 2050 (0.00205) | 750 (0.00075) | 740 |
| Comparative Experiment A | * | 1200 (0.0012) | 708 |
| Comparative Experiment B | 3500 (0.0035) | 900 (0.00099) | 714 |

*An accurate viscosity reading could not be taken due to sample climbing viscosity cone.

TABLE II

| EPOXY RESIN EMPLOYED | AMOUNT OF EPOXY RESIN grams | CURING AGENT | | MODAFLOW $II^3$ grams | FILLER Type; grams |
|---|---|---|---|---|---|
| | | $A^1$ grams | $B^2$ grams | | |
| Ex. 1 | 500 | 9.58 | 6.0 | 13.32 | $BaSO_4$; 150 |

TABLE II-continued

| EPOXY RESIN EMPLOYED | AMOUNT OF EPOXY RESIN grams | CURING AGENT A[1] grams | CURING AGENT B[2] grams | MODAFLOW II[3] grams | FILLER Type; grams |
|---|---|---|---|---|---|
| Ex. 2 | 500 | 9.27 | 6.0 | 13.30 | BaSO$_4$; 150 |
| Ex. 3 | 500 | 9.34 | 6.0 | 13.30 | BaSO$_4$; 150 |
| Ex. 4 | 600 | 11.09 | 7.2 | 15.96 | BaSO$_4$; 180 |
| Ex. 5 | 500 | 9.21 | 6.0 | 13.30 | BaSO$_4$; 150 |
| Comp. Expt. A | 500 | 9.86 | 6.0 | 13.32 | BaSO$_4$; 150 |

| EPOXY RESIN EMPLOYED | FILM THICKNESS mils (mm) | GLOSS DEGREES, PERCENT | GARDNER IMPACT FORWARD REVERSE in. lb. (J) | COATING APPEARANCE |
|---|---|---|---|---|
| Ex. 1 | 1.2–2.2 (0.03–0.06) | 20, 5.0 60, 25.1 85, 48.0 | 160/160 (18.08/18.08) | Flawless |
| Ex. 2 | 1.3–1.7 (0.03–0.04) | 20, 4.7 60, 18.3 85, 59.2 | 160/160 (18.08/18.08) | Flawless |
| Ex. 3 | 1.2–2.0 (0.03–0.05) | 20, 5.0 60, 21.0 85, 46.4 | 140/120 (15.8/13.56) | Flawless |
| Ex. 4 | 1.2–2.2 (0.03–0.06) | 20, 2.8 60, 15.7 85, 65.5 | 160/160 (18.08/18.08) | A |
| Ex. 5 | 1.4–2.4 (0.04–0.06) | 20, 4.7 60, 17.0 85, 57.8 | 160/160 (18.08/18.08) | Flawless |
| Comp. Expt. A | 1.4–2.2 (0.04–0.06) | 20, 4.3 60, 23.4 85, 62.1 | 160/160 (18.08/18.08) | A |

[1]Curing Agent A was dicyandiamide.
[2]Curing Agent B was mixture of 83 percent by weight dicyandiamide and 17 percent by weight 2-methylimidazole.
[3]A polyacrylate flow control agent (Monsanto).
A = slight to barely perceptible texturing of surface

TABLE III

| EPOXY RESIN EMPLOYED | AMOUNT OF EPOXY RESIN grams | CURING AGENT A[1] grams | CURING AGENT B[2] grams | MODAFLOW II[3] grams | FILLER Type; grams |
|---|---|---|---|---|---|
| Ex. 5 | 500 | 9.21 | 6.0 | 18.72 | TiO$_2$; 421 |
| Comp. Expt. A | 400 | 8.05 | 4.8 | 15.01 | TiO$_2$; 337.86 |
| Comp. Expt. B | 400 | 7.78 | 4.8 | 15.00 | TiO$_2$; 337.56 |

| EPOXY RESIN EMPLOYED | FILM THICKNESS mils (mm) | GLOSS DEGREES, PERCENT | GARDNER IMPACT FORWARD REVERSE in.-lb. (J) | COATING APPEARANCE |
|---|---|---|---|---|
| Ex. 5 | 1.3–2.1 (0.03–0.05) | 20, 5.9 60, 31.1 85, 45.7 | 100/80 (11.3/9.04) | B, C |
| Comp. Expt. A | 1.4–2.3 (0.04–0.06) | 20, 1.6 60, 7.4 85, 22.3 | 100/40 (11.3/4.52) | B, C |
| Comp. Expt. B | 1.3–2.0 (0.03–0.05) | 20, 25.6 60, 68.6 85, 75.0 | 160/100 (18.08/11.3) | B |

[1]Curing Agent A was dicyandiamide
[2]Curing Agent B was mixture of 83 percent by weight dicyandiamide and 17 percent by weight 2-methylimidazole
[3]A polyacrylate flow control agent (Monsanto)
B = pronounced texturing of surface orange peel)
C = cracking type failure noted at Gardner impact sites

TABLE IV

| EPOXY RESIN EMPLOYED | KINEMATIC VISCOSITY AT 150° C. cks (m²/s) | EEW |
|---|---|---|
| Example 1 | 4541 (0.004541) | 721 |
| Comparative Experiment A | 7638 (0.007638) | 702 |

EXAMPLE 10

Inclined Plate Flow Test

Inclined plate flow was determined for the resins of Example 1, Example 4, Example 5 and Comparative Experiment A using the formulations prepared in Example 8 and a herein described modification of standard method ASTM D3451, Section 17. Samples (0.75 gram) of each resin were pressed in to 0.25" (6 mm) thick by 0.50" (12.7 mm) diameter pellets utilizing a Parr 2811 Pellet Press, stainless steel die (Parr Instrument Co., Moline, Ill. Three pellets of each Example resin were prepared, six pellets of Comparative Experiment A were prepared and used as controls.

A constant temperature forced air electric oven (Gruenberg Oven Co., Inc.) was set at 350° F. The inner oven contained a metal plate rack assembly 5.7" (14.5 cm)×6" (15.2 cm) which was capable of being maintained in either a horizontal position or at a 65 degree angle by means of an exterior lever. A 4"×12"×20 gauge (101.6 mm×304.8 mm×0.529 mm) polished. S412, Q-panel (The Q-Panel Co., Cleveland, Ohio) was cut in half (4"×6"×20 gauge (101.6 mm×152.4 mm×0.529 mm)) and placed in the preheated oven on the horizontal rack assembly. The panel was allowed to equilibrate for ten minutes (600 s) at 350° F. After the panel had equilibrated at 350° F. for ten minutes (600 s), three pellets—one from Example 1, one from Example 4 and one from Comparative Experiment A were placed across the top of the preheated panel. The oven door was quickly closed, 30 seconds later the rack assembly holding the heated panel and pellets was tilted to 65 degrees from the horizontal via the exterior lever without opening the oven door. The rack, panel and pellets were allowed to remain in this position for 15 minutes (900 s). After 15 minutes (900 s), the panel was removed from the oven and allowed to cool to room temperature (25° C.). The maximum flow, in millimeters, from the original diameter was measured. The same procedure was repeated for Example 5 and Comparative Experiment A. A series of three inclined plate flow tests was evaluated for each resin and the average millimeter flow value is reported in Table V.

TABLE V

| DESIGNATION OF EPOXY RESIN | AVERAGE INCLINED PLATE FLOW/STANDARD DEVIATION (mm) |
|---|---|
| Example 1 | 97.3/ ± 1.8 |
| Example 4 | 69.8/ ± 4.5 |
| Example 5 | 95.6/ ± 4.7 |
| Comparative Experiment A | 57.1/ ± 1.3 |

We claim:

1. A nonaqueous thermosettable or curable composition substantially free of volatile components comprising a curing amount of a suitable curing agent and the product resulting from
   (I) polymerizing in the presence of a catalytic quantity of at least one suitable polymerization catalyst
      (A) the reaction product of
         (1) at least one diglycidyl ether of a dihydric phenol or diglycidyl ether of a dihydric cyclohexanol having an epoxide equivalent weight of from about 111 to about 350 with the epoxide equivalent weight being calculated on the basis that there are no substituent groups attached to the aromatic ring(s) or cycloaliphatic ring(s) other than hydrogen and the ether oxygen atoms even though the aromatic ring(s) or cycloaliphatic ring(s) may in fact be substituted by groups other than hydrogen and the ether oxygen atoms;
         (2) at least one compound containing both a group reactive with an epoxide group and a polymerizable ethylenically unsaturated group in an amount of from about 0.001 to about 0.05 equivalent per epoxide equivalent contained in component (A-1); with
      (B) a monomer mixture comprising
         (1) at least one vinyl aromatic monomer in an amount of from about 31 to about 60 percent by weight of the combined weight of components (A), (B) and (C);
         (2) at least one compound containing both a group reactive with an epoxide group and a polymerizable ethylenically unsaturated group in an amount of from about 0.001 to about 0.05 equivalent per epoxide equivalent contained in component (A-1); and
         (3) one or more hydroxyalkyl acrylate, hydroxyalkyl methacrylate, alkyl acrylate or alkyl methacrylate in an amount of from about zero to about 15 percent by weight of the combined weight of components (B-1) and (B-3); and
   (II) advancing in the presence of a catalytic quantity of at least one suitable advancement catalyst, the product resulting from (I) with a mixture comprising
      (C) at least one dihydric phenol in an amount of from about 0.125 to about 0.8 hydroxyl equivalent per epoxide equivalent in component (A-1) and
      (D) at least one diglycidyl ether of an aliphatic or cycloaliphatic mono-, di- or polyetherdiol or at least one phenolic capped adduct of a diglycidyl ether of an aliphatic or cycloaliphatic mono-, di- or polyetherdiol or combination thereof wherein the amount of the diglycidyl ether or the amount of the diglycidyl ether contained in the capped diglycidyl ether is from about 1 to about 20 percent by weight of components (I-A-1) and (II-D).

2. A nonaqueous thermosettable or curable composition of claim 1 which is a powder coating formulation containing as a curing agent therefor a biguanide and optionally containing one or more adjuvants selected from the group consisting of curing agent accelerator or catalyst, particulate filler, pigment, flow control additive, gloss control additive, texture control additive, air release additive, slip aid and the like.

3. A nonaqueous thermosettable or curable composition of claim 2 wherein said curing agent is dicyandiamide accelerated with 2-methylimidazole.

4. A nonaqueous thermosettable or curable composition of claim 1 wherein
   (i) component (A-1) is employed in an amount of from about 90 to about 95 percent by weight;

(ii) component (A-2) is present in an amount of from about 0.005 to about 0.025 equivalent per epoxide equivalent;
(iii) component (B-1) is present in an amount of from about 35 to 45 percent;
(iv) component (B-2) is present in an amount of from about 0.005 to about 0.025 equivalent per epoxide equivalent;
(v) component (B-3) is present in an amount of from about zero to about 5 percent by weight;
(vi) component (C) is present in an amount of from about 0.375 to about 0.5 hydroxy equivalent per epoxide equivalent; and
(vii) component (D) is present in an amount of from about 5 to about 10 percent by weight.

5. A nonaqueous thermosettable or curable composition of claim 4 which is a powder coating formulation containing as a curing agent therefor a biguanide and optionally containing one or more adjuvants selected from the group consisting of curing agent accelerator or catalyst, particulate filler, pigment, flow control additive, gloss control additive, texture control additive, air release additive, slip aid and the like.

6. A nonaqueous thermosettable or curable composition of claim 5 wherein said curing agent is dicyandiamide accelerated with 2-methylimidazole.

7. A thermosettable or curable composition of claim 4 wherein
(i) component (A-1) is an epoxy resin or mixture of epoxy resins represented by the following formulas (I), (II), (III) or (IV)

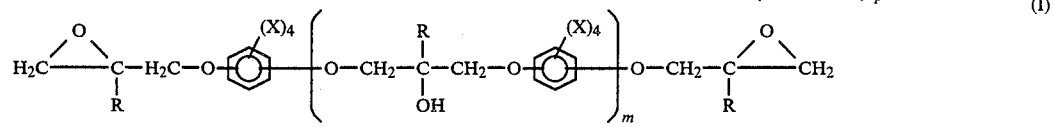
(I)

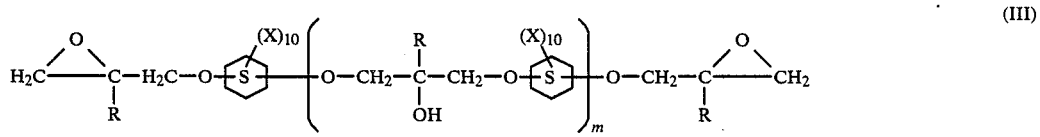
(II)

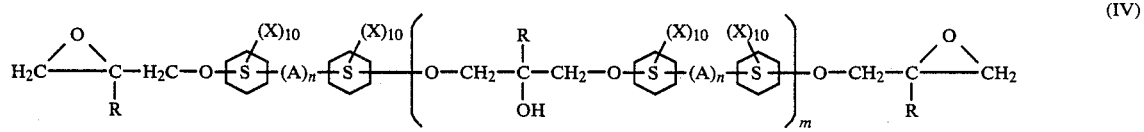
(III)

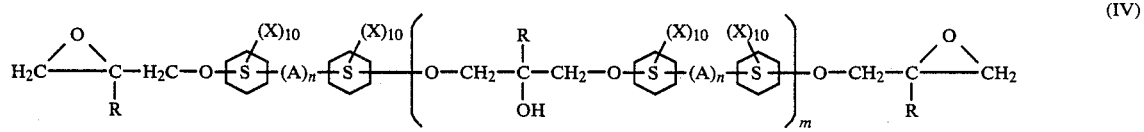
(IV)

wherein each A is independently a divalent hydrocarbon group having from one to about 10 carbon atoms, —O—, —S—, —S—S—, —SO—, —SO$_2$, or —CO—; each X is independently hydrogen, bromine, chlorine, or a hydrocarbyl or hydrocarbyloxy group having from 1 to about 10 carbon atoms; each R is independently hydrogen or a methyl group; m has a value from zero to about 5; and n has a value of zero or 1;

(ii) component (C) is one or more dihydric phenols represented by the following formulas (VIII) or (IX)

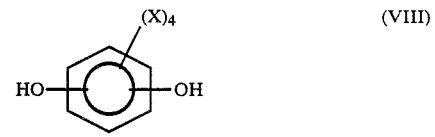
(VIII)

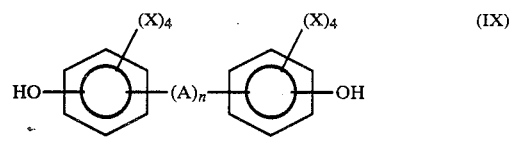
(IX)

wherein X, A and n are as hereinbefore defined; and
(iii) component (D) is an epoxy resin or mixture of epoxy resins represented by the following formula (V)

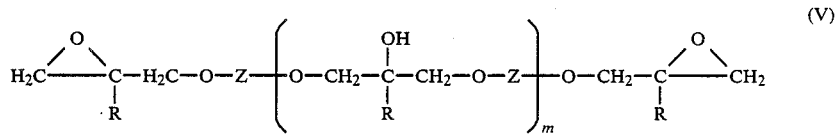
(V)

wherein Z is a hydrocarbyl group containing from 1 to about 12 carbon atoms or a

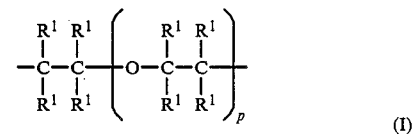
(I)

group, wherein each $R^1$ is independently hydrogen or a hydrocarbyl group having from 1 to about 6 carbon atoms, and p has a value from 1 to about 100; m and R are as hereinbefore defined.

8. A nonaqueous thermosettable or curable composition of claim 7 which is a powder coating formulation containing as a curing agent therefor a biguanide and optionally containing one or more adjuvants selected from the group consisting of curing agent accelerator or catalyst, particulate filler, pigment, flow control additive, gloss control additive, texture control additive, air release additive, slip aid and the like.

9. A nonaqueous thermosettable or curable composition of claim 8 wherein said curing agent is dicyandiamide accelerated with 2-methylimidazole.

10. A nonaqueous thermosettable or curable composition of claim 7 wherein (i) component (A-1) is a diglycidyl ether of bisphenol A, a diglycidyl ether of tetrabromobisphenol A, a diglycidyl ether of bisphenol F, or any combination thereof;

(ii) component (A-2) is methacrylic acid, acrylic acid, or combination thereof;

(iii) component (B-1) is styrene, methylstyrene, or any combination thereof;

(iv) component (B-2) is methacrylic acid, acrylic acid, or combination thereof;

(v) component (B-3) is hydroxyethyl acrylate, hydroxypropyl acrylate, hydroxyethyl methacrylate, hydroxypropyl methacrylate, lauryl methacrylate, or any combination thereof;

(vi) component (C) is bisphenol A, tetrabromobisphenol A, bisphenol F, or any combination thereof; and (vii) component (D) is a diglycidyl ether of a polyoxypropylene glycol, a diglycidyl ether of dipropylene glycol, a diglycidyl ether of a polyoxyethylene glycol, or any combination thereof.

11. A nonaqueous thermosettable or curable composition of claim 10 which is a powder coating formulation containing as a curing agent therefor a biguanide and optionally containing one or more adjuvants selected from the group consisting of curing agent accelerator or catalyst, particulate filler, pigment, flow control additive, gloss control additive, texture control additive, air release additive, slip aid and the like.

12. A nonaqueous thermosettable or curable composition of claim 11 wherein said curing agent is dicyandiamide accelerated with 2-methylimidazole.

13. A product resulting from curing the composition of claim 1.

14. A product resulting from curing the composition of claim 2.

15. A product resulting from curing the composition of claim 3.

16. A product resulting from curing the composition of claim 4.

17. A product resulting from curing the composition of claim 5.

18. A product resulting from curing the composition of claim 6.

19. A product resulting from curing the composition of claim 7.

20. A product resulting from curing the composition of claim 8.

21. A product resulting from curing the composition of claim 9.

22. A product resulting from curing the composition of claim 10.

23. A product resulting from curing the composition of claim 11.

24. A product resulting from curing the composition of claim 12.

* * * * *